J. B. GOLDSMITH.
SPOKE-SOCKET.
No. 172,422. Patented Jan. 18, 1876.
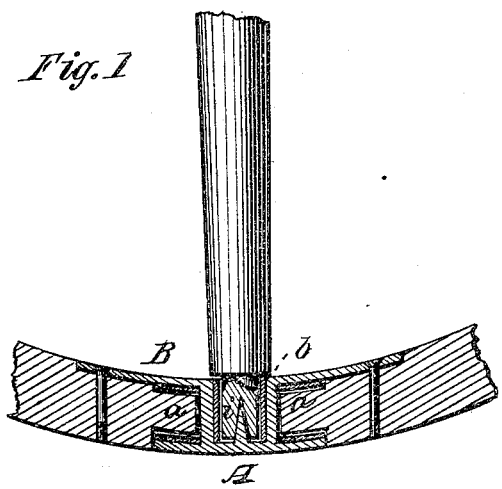
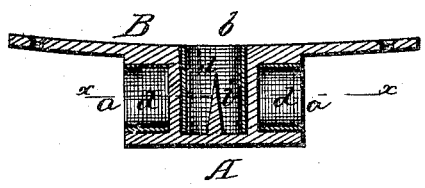
Witnesses:
F. C. Dieterich
Frank N. Duffy
Inventor:
Jacob B. Goldsmith
Per: C. H. Watson, Attorneys.

UNITED STATES PATENT OFFICE.

JACOB B. GOLDSMITH, OF ROCKPORT, MASSACHUSETTS.

IMPROVEMENT IN SPOKE-SOCKETS.

Specification forming part of Letters Patent No. 172,422, dated January 18, 1876; application filed December 27, 1875.

*To all whom it may concern:*

Be it known that I, JACOB B. GOLDSMITH, of Rockport, in the county of Essex and State of Massachusetts, have invented certain new and useful Improvements in Device for Holding the Ends of Fellies; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a connection or union for fellies and spokes of wheels, provided with a rubber lining, as will be hereinafter more fully set forth, whereby both the spoke and the felly are furnished with a rubber or elastic cushion or lining, and held in position by the metallic union of the felly.

In the annexed drawing, Figure 1 is a side elevation, partly in section, and Figs. 2 and 3 are detail sections of the same.

The connection or union is cast, or otherwise formed, of a single piece of metal, A, with a socket, $a$, formed in each end for the insertion of the ends of the ordinary wooden spokes and of the fellies, and a central hole or socket, $b$, from the inner edge inward, for the insertion of the end of the spoke. The body of the union A forms, as it were, a continuation of the felly, or, in other words, fills the space between two adjoining fellies, tenons on the ends of said fellies entering the holes or sockets $a$ in the ends of the union. At the inner edge of the union A, from each end, projects an arm or clip, B, which extends a suitable distance along the inner side of the felly, and a bolt is passed through said clip, and through the felly and tire of the wheel, thereby preventing the fellies from spreading. The holes or sockets $a$ $a$ and $b$ are all provided with a rubber lining, $d$, which will prevent all rattling, if the wood should shrink. In the center of the socket $b$ is a small spear or wedge, $i$, to enter the end of the spoke when driven therein, and thereby wedge it firmly in place.

I am aware that elastic cushions have been used for spokes in connection with fellies, and also patent No. 48,207, and I do not therefore claim such as my invention; but

Having thus fully described my invention, what I claim as new, and desire to secure by Letters Patent, is—

In a carriage-wheel, the union A having the socket $b$, spear or wedge $i$, sockets $a$ $a$, and clip B, in combination with the rubber lining $d$ for the spokes and ends of the ordinary wooden fellies, all constructed and arranged as and for the purpose specified.

In testimony that I claim the foregoing as my own I affix my signature in presence of two witnesses.

JACOB B. GOLDSMITH.

Witnesses:
 LEROY GOLDSMITH,
 WILLIAM W. MARSHALL.